Figure 1:
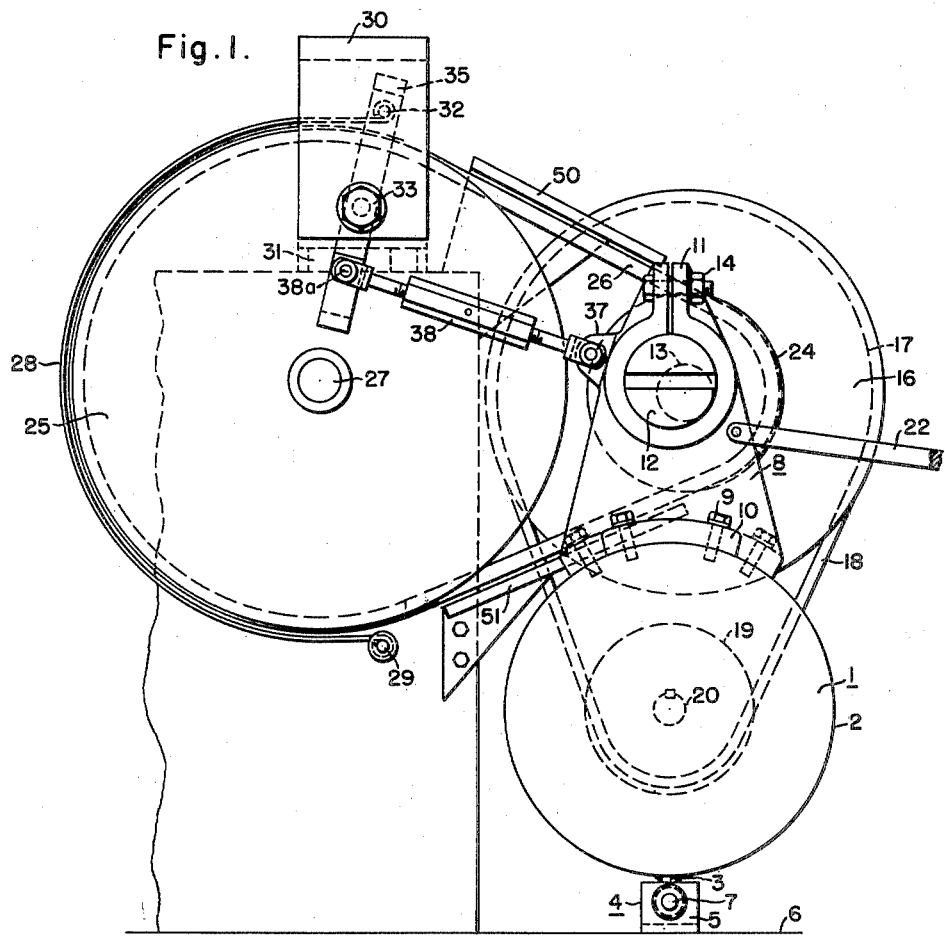

Nov. 13, 1956 J. H. PENNEY 2,770,338
MECHANICAL DRIVE

Filed Jan. 30, 1953 4 Sheets-Sheet 1

WITNESSES:
Robert C. Baird
E. F. Oberhein

INVENTOR
James H. Penney.
BY
Paul C. Friedemann
ATTORNEY

Nov. 13, 1956 J. H. PENNEY 2,770,338
MECHANICAL DRIVE
Filed Jan. 30, 1953 4 Sheets-Sheet 3

WITNESSES:
Robert C. Baird
E. F. Oberheim

INVENTOR
James H. Penney.
BY
Paul E. Friedemann
ATTORNEY

Nov. 13, 1956 J. H. PENNEY 2,770,338
MECHANICAL DRIVE
Filed Jan. 30, 1953 4 Sheets-Sheet 4

WITNESSES:
Robert C. Baird
E. F. Oberhein

INVENTOR
James H. Penney.
BY
Paul E. Friedemann
ATTORNEY

United States Patent Office 2,770,338
Patented Nov. 13, 1956

2,770,338

MECHANICAL DRIVE

James H. Penney, Buffalo, N. Y., assignor to Westinghouse Electric Corporation, East Pittsburgh, Pa., a corporation of Pennsylvania Application January 30, 1953, Serial No. 334,153

9 Claims. (Cl. 192—11)

This invention relates generally to mechanical drives, and more in particular to such drives in which power transmission between driving and driven members is accomplished by pulleys and belts.

Drives of this character are utilized in a wide variety of applications. The drive herein disclosed is directed particularly to an application in driving a textile loom. In this field there is a demand for a motor drive with a clutch and brake control forming essentially a part of the motor which drives the loom. Speed adjustment is another important consideration which has resulted in many applications of six-pole motors in an effort to get finer steps in speed control.

These requirements, while not of a complex nature, do present difficulties in the development of a satisfactory drive which is simple and economical.

Accordingly, it is one object of this invention to provide a mechanical drive of the character mentioned which is simple with respect to operational requirements and positive in operation.

Another object of this invention is to provide a mechanical drive of the class referred to involving a clutch and a brake both of which are operated by a single mechanical movement.

A further object of this invention is to provide a belt drive of the type mentioned in which the belt is used as one of the friction members of the brake.

More specifically, it is an object of this invention to provide a belt drive involving a flywheel on the driving member in which the flywheel is disengaged from the driven member when the driven member is braked.

Further to the preceding object, it is an object of this invention to provide the belt drive with a single control wherein declutching and braking are achieved by a simple single movement.

Still more specifically with regard to the preceding object, it is an object of this invention to declutch the drive by disengaging the driving member from the belt and to effect braking by utilizing the belt as a friction member of the brake.

Yet another object of this invention is to provide a mechanical drive of the character referred to having a simple mechanical speed adjustment affording a substantially stepless range of speed control.

Figure 2:
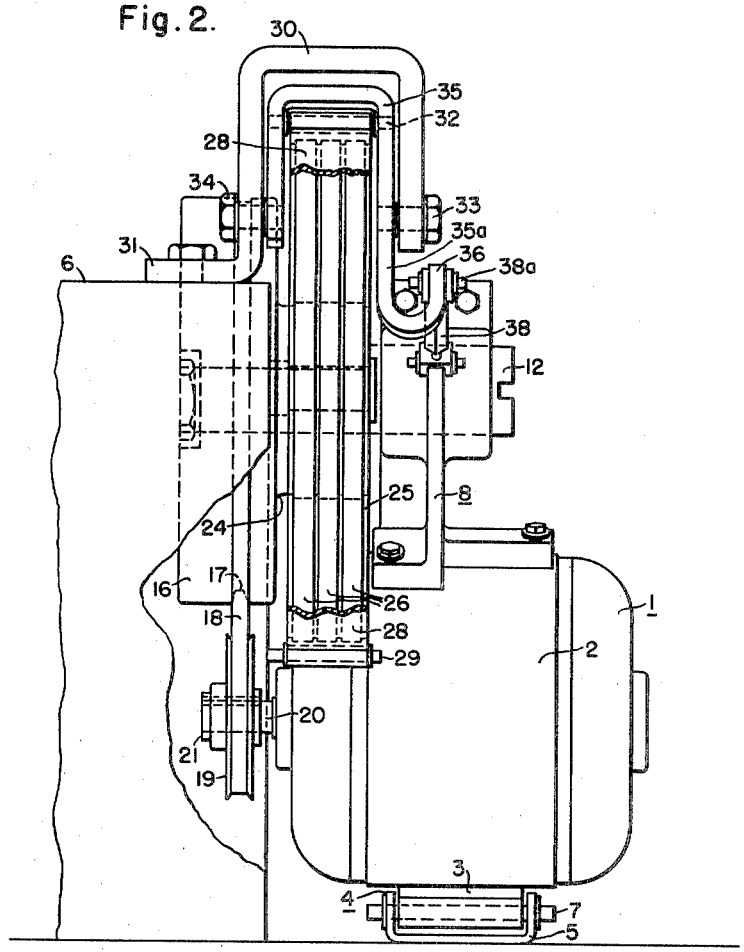
Figure 3:
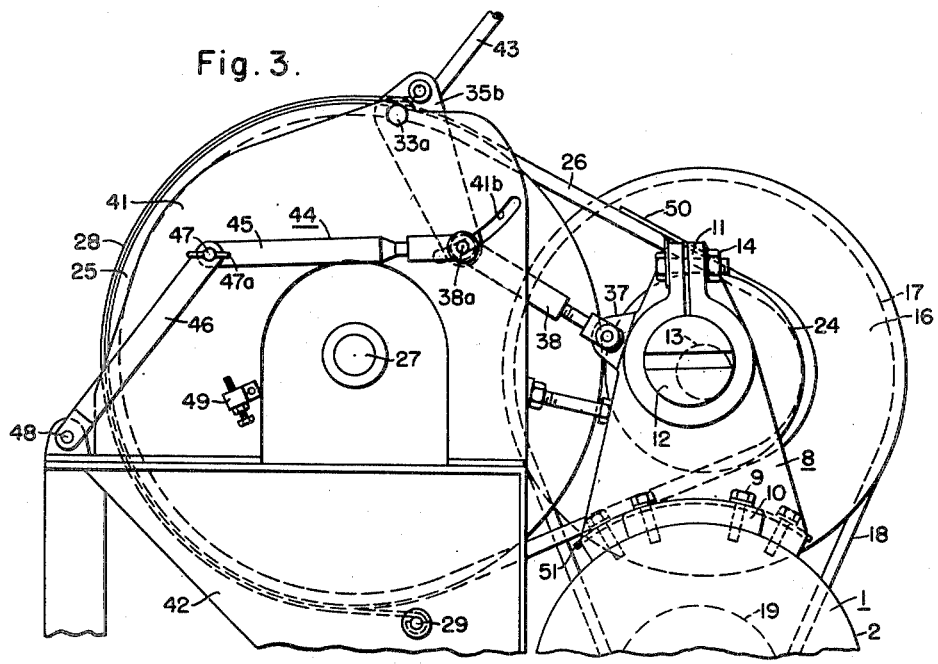
Figure 4:
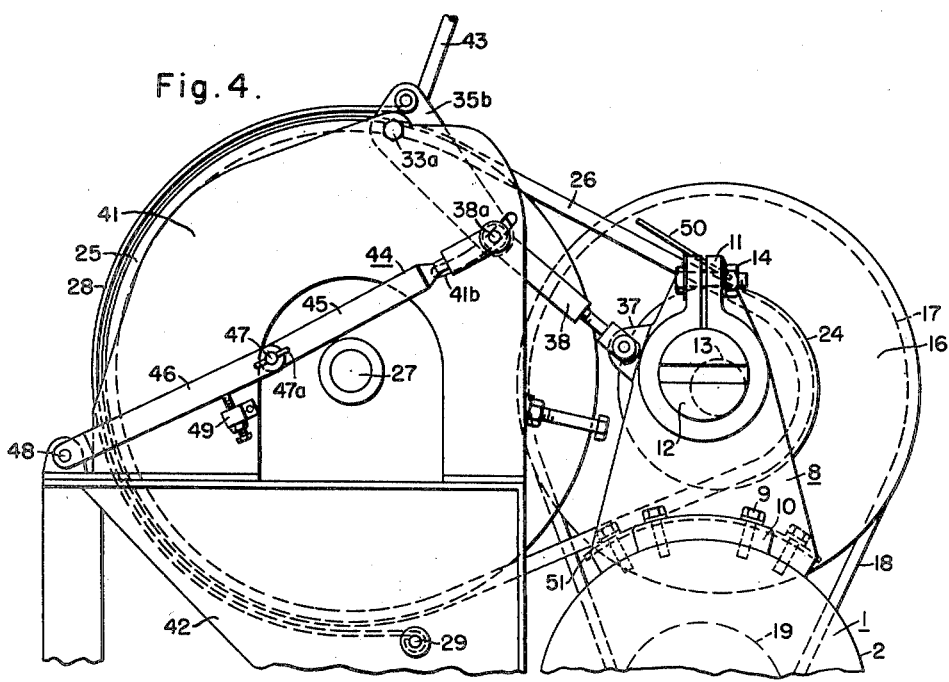
Figure 5:
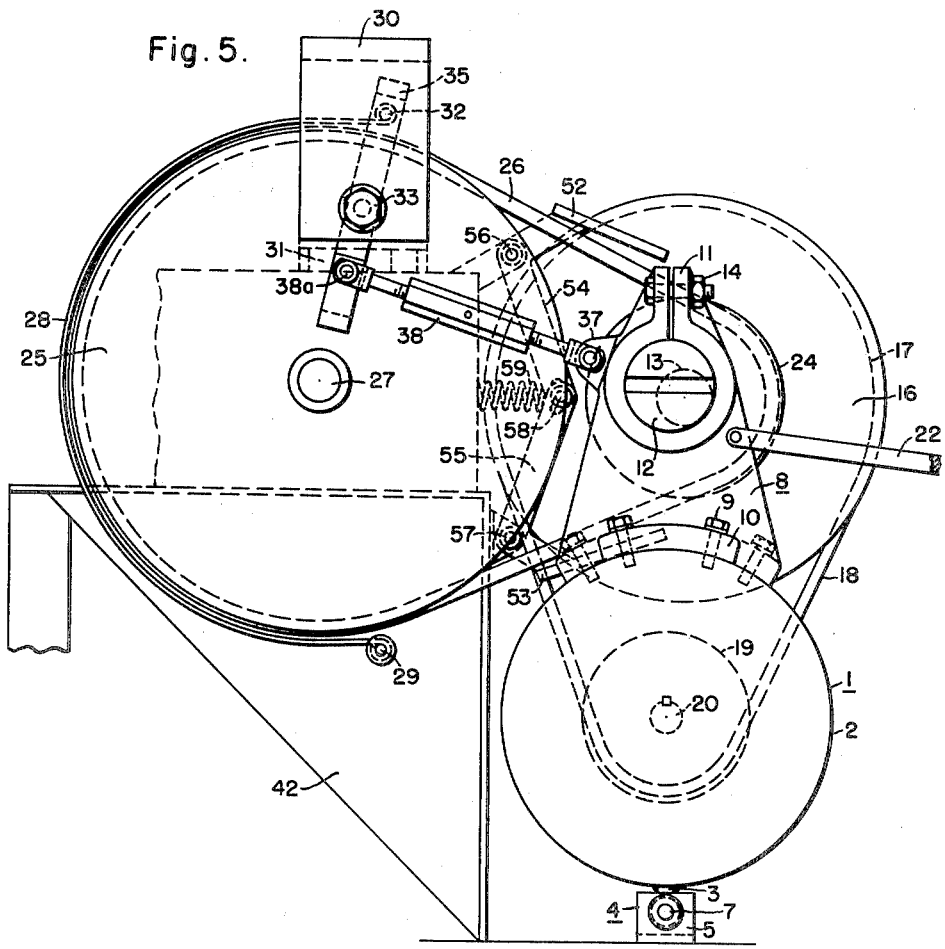

These and other objects and advantages will become apparent from a study of the following disclosure, when considered in conjunction with the accompanying drawings, in which:

Figure 1 is a side view of the belt drive embodying the principles of this invention, Fig. 2 is an end view of the belt drive illustrated in Fig. 1, Figs. 3 and 4 show details of an operating linkage for controlling the drive between driving and disconnect positions, and Fig. 5 shows an alternative belt supporting arrangement.

The belt drive herein illustrated is powered by an electric motor generally designated 1, as seen in Figs. 1 and 2. This motor is provided with an outer housing 2, which encloses or substantially encloses the motor, to the bottom side of which is secured a hinge bracket 3 forming part of a hinge generally designated 4. A U-shaped bracket 5 constitutes the stationary portion of the hinge and straddles the hinge bracket 3 from one end to the other. The U-shaped support 5 is secured to a suitable stationary support 6 and is joined to the hinged bracket 3 by means of a hinge pin 7 according to standard practice. Thus, the motor may be tilted from side to side as viewed in Fig. 1.

A jack shaft pedestal 8 is bolted to the upper side of the motor housing by means of bolts 9 extending through suitable flanges 10 formed at the base of the jack shaft pedestal and shaped to follow the contour of the surface of the motor housing. Bolts 9 as shown thread into suitably tapped holes in the motor housing. The upper end of the jack shaft pedestal terminates in a split jack shaft clamp 11 which receives a jack shaft 12 having an eccentric section 13 formed thereon. This jack shaft is secured against rotation in the jack shaft pedestal by tightening of nuts 14 which securely clamp the jack shaft in the pedestal.

A flywheel 16 is mounted on the eccentric portion 13 of the jack shaft. This flywheel is provided with a peripheral V shaped groove 17 adapted to receive a V belt 18 which passes about a variable pitch diameter pulley 19 secured to the motor shaft 20. This variable pitch pulley 19 affords a means for varying the speed of the drive, for a given motor speed, over a predetermined range. This is accomplished by adjusting the distance between the back and front faces of the pulley so that the belt is caused to ride higher or lower in the pulley groove which changes the linear velocity of the belt by varying the radial moment arm of the pulley. The pitch diameter is adjusted by adjusting the nuts generally designated 21 which control the pitch diameter of the sheave. The details of this adjustment are not shown since they are conventional. The eccentric mounting of the flywheel 16 on the eccentric portion of the jack shaft affords a means for varying the distance between the centers of the motor pulley 19 and the flywheel to accommodate the differences in the pitch diameter of the pulley sheave 19 whenever the pitch diameter is changed.

The pedestal may be adjustably secured in the vertical position indicated by means of a link 22 forming part of the control for the mechanical drive. This link 22 may connect to a suitable control handle conveniently located at some control point on the machine or it may be actuated by means of an electrical solenoid or hydraulic piston between two positions by a control of the solenoid or hydraulic piston from a station located, for example, at the control panel for the loom. These and other means may be utilized to operate the link 22 as will be explained hereinafter with reference to Figs. 3 and 4.

A driving pulley 24 may be formed integrally with, or may be secured to rotate with the flywheel 16, in any suitable manner. This driving pulley also rotates about the eccentric portion 13 of the jack shaft 12 and is connected to a driven pulley 25 by means of three V belts 26. To this end, each of the driving and driven pulleys are provided with V grooves which are disposed in side-by-side relationship. The driven pulley is rotatably mounted upon support 6 which may, or may not, depending upon specific structural requirements, form a part of the machine which is to be controlled. The shaft 27 of pulley 25 is adapted for connection to the machine which is to be driven. In the interest of simplicity, such a machine is not shown.

Rotation of the driven pulley may be braked by means of a brake arrangement including a friction member such as a brake band 28, the bottom end of which is pivotally secured to the support 6 by means of a pin 29. An inverted U-shaped bracket 30 equipped with a mounting flange 31, which is bolted to the top of support 6, straddles the upper side of pulley 25. Bolts 33 and 34 in bracket 30 pivotally mount an inverted U-shaped lever 35 to which the remaining end of the brake band 28 is pinned by pin 32 at a point adjacent the bight. As seen in Fig. 2, the right hand leg 35a of the U-shaped lever 35 terminates in a U-shaped extremity 36 which is spaced outwardly from the mentioned leg and which substantially parallels the mentioned leg. This provides an operating point for applying a force to the brake operating lever 35 at a point on the opposite side of the fixed pivot axis thereof from the point of connection of the brake band thereto. Extremity 36 of the brake operating lever is connected to an extension 37 of the reinforcing web of the jack shaft pedestal 8 by means of a lock wire type of turn buckle, generally designated 38, which provides a means for adjusting the brake band clearance whenever the jack shaft pedestal is in the position indicated.

As will be seen by reference to Fig. 1, the V belts 26 ride above the outer edges of the grooves in driven pulley or sheave 25 and in this position are adapted for engagement by the brake band 28 whenever the brake is applied. To apply the brake, link 22 is moved to the left as seen in Fig. 1. This tilts the motor and jack shaft pedestal assembly about pin 7. As a consequence, the upper end of the jack shaft pedestal moves towards the driven pulley 25. This operation simultaneously loosens the V belts 26 to disengage the driving pulley 24 from the driven pulley 25 and at the same time, by the connection through the turn buckle link 38 effects a clockwise rotation of brake operating lever 35 about its fixed pivot axis. As will be seen in Fig. 1, this displaces the upper end of brake lever 35 to the right which pulls the brake band against the belts 26. The braking effort is determined by the force which is applied to the link 22 together with the mechanical advantage of the connection to the brake lever through the linkages indicated.

Figs. 3 and 4 show two positions of a linkage embodying the principles described above, with the exception of link 22, and which additionally provides a toggle linkage which locks the drive in engaged position. Fig. 3 shows the drive disengaged and Fig. 4 shows the drive engaged. In these figures parts corresponding to those of Figs. 1 and 2 bear like reference characters.

In these figures the motor 2 and jack shaft pedestal assembly are pivotally mounted on a base plate 40 in a manner similar to that shown in Fig. 1 supported in any suitable manner. The brake linkage is carried between a pair of spaced plates 41 only one of which shows in the drawing, the other plate lying behind that which is shown. Plates 41 are secured to a triangular support 42 which is only partially shown, but which is fully shown in Fig. 5.

Brake lever 35b is pivotally mounted by bolt 33a between plates 41. Its lower end is pivotally connected as before by pin 38a to one end of turnbuckle link 38 and its upper end is pivotally connected to the free end of the brake band 28. A bar or handle 43 is secured to brake lever 35a. This bar when manually operated drives the brake lever 35a to simultaneously disengage the drive and apply the brake and vice versa.

A toggle linkage 44, on the front side of front plate 41, comprising a pair of links 45 and 46 pivotally connected by pin 47 in end to end relation has its extremities pivotally connected between the pin 38a extending through an arcuate slot 41b in front plate 41 and a fixed pin 48 on the support 42. A stop 49 mounted on plate front 41 limits the toggle linkage over-travel when in locked position. The toggle linkage is released by grasping a bar 47a on the end of pin 47 and pulling the linkage off of stop 49.

To engage the drive, handle 43 is moved counterclockwise as viewed. Through the brake lever and link 38 the jack shaft pedestal assembly rotates clockwise engaging the jack shaft pulley 24 with belts 26 and simultaneously the brake is released. During this movement of the brake lever, the toggle linkage is straightened whereupon it drops under a gravity bias against stop 49 which locks the drive in engaged position.

By grasping bar 47a and pulling upwardly, the toggle is released. Thereafter the drive is completely disengaged by clockwise movement of handle 43, the braking force being determined by the force exerted upon the handle.

The means thus far described provide an effective yet simple means for controlling rotative movement of driven pulley or sheave 25. Certain improvements may be realized, however, in obtaining positive disconnection of pulley 24 from belts 26 by providing suitable belt supports 50 and 51 above the below the belt, respectively, as indicated in Fig. 1. These belt supports as will be seen, substantially span the unsupported length of belts 26 between the driving and driven pulleys or sheaves, and are positioned in spaced relation with the belt and substantially paralleling the belt. These may be secured in any suitable manner to the support 6 as indicated in Fig. 1 or, as seen in Figs. 3 and 4, may be respectively secured by nut 14 to the top of the jack shaft pedestal and by bolts 4 to flange 10 of the pedestal to substantially occupy the positions shown. Hence, as the pulley 24 is moved towards the pulley 25 to effect a disconnection in the drive, the belts will tend to move outwardly and attempt to assume a substantially arcuate shape when the tension is released. This movement, however, is limited by the supports 50 and 51 to such an extent that the shape of the belt does not change appreciably from that illustrated when the belt is under tension. As a consequence, the pulley 24 may be effectively disconnected from belts 26 by displacement of its axis through a distance sufficient to apply the brake. Thus, the braking effort is minimized, since the stored energy of the flywheel and the motor energy are completely removed from the driven pulley or sheave 25.

As an alternative to the belt supporting arrangement shown, a moveable lever arrangement may be utilized. For instance, as seen in Fig. 5, a set of movable supports 52 and 53 may be employed adjacent the sections of the belts between the pulleys. These movable supports may be carried at the respective outer ends of levers 54 and 55 having respective fixed pivots 56 and 57 intermediate their ends. The inner ends of these levers overlap and are joined by a pin 58 in lever 55 operating in a slot in lever 54. A compression spring 59 biases the inner ends of the levers towards the jack shaft pedestal moving the belt supports away from the belt. When the pedestal is tilted towards the levers 54 and 55 to disengage the drive, the pedestal engages the overlapping ends of the levers causing them to rotate in such directions as to engage the movable supports 52 and 53 with the belts. This arrangement follows the principles of that described above in that the belt is supported in such a way that by small displacement of the driving pulley 24 towards the driven pulley, the driving pulley may be completely disengaged from belts 26 to effect positive declutching of the drive at this point.

Although a brake band has been illustrated as the braking member in this drive, and although such a brake band affords advantages, in view of the relatively large friction area which is obtainable for braking purposes, it will be appreciated by those skilled in the art that a brake shoe may be utilized in place of the brake band. This brake shoe may be supported at any point along that brake shoe may be supported at any point along that peripheral region in which the belts ride in the grooves in the sheave or pulley 25 so that the brake shoe may be pulled into engagement with the surfaces of the belts. The particular manner of mounting such a shoe can closely approximate the manner of mounting the free end of the brake band. Obviously, other conventional linkages including those involving only linear displacement of the shoe rather than angular displacement may be utilized within the spirit of this invention. Numerous other variations in the geometry of this drive may be achieved by those skilled in the art. It will be appreciated that the majority of such variations involve only structural equivalents of the apparatus shown both as to organization of parts and in details of parts.

Accordingly, it is intended that the foregoing disclosure and the showings made in the drawing shall be considered only as illustrative of the principles of this invention and are not to be interpreted in a limiting sense.

I claim as my invention:

1. A belt drive comprising, a stationary support, a drive motor, means pivotally mounting said drive motor on said stationary support, a jack shaft pedestal secured to said motor and projecting upwardly therefrom, a jack shaft secured in said pedestal, a motor pulley secured to the shaft of said motor, a flywheel, a driving pulley connected to said flywheel, said flywheel and driving pulley being mounted on said jack shaft, a driven pulley mounted on said stationary support, a first belt connecting said motor pulley and said flywheel, a second belt connecting said driving and driven pulleys, said motor and pedestal tilting toward said driven pulley to loosen said second belt, a friction member, a lever movably mounting said friction member on said stationary support adjacent the portion of said second belt passing over said driven pulley, and a link connecting said lever with said pedestal to actuate said friction member by movement of said pedestal.

2. A belt drive comprising, a stationary support, a drive motor, means pivotally mounting said drive motor on said stationary support, a jack shaft pedestal secured to said motor and projecting upwardly therefrom, a jack shaft secured in said pedestal, a motor pulley secured to the shaft of said motor, a flywheel, a driving pulley connected to said flywheel, said flywheel and driving pulley being mounted on said jack shaft, a driven pulley mounted on said stationary support, a first belt connecting said motor pulley and said flywheel, a second belt connecting said driving and driven pulleys, said motor and pedestal tilting toward said driven pulley to loosen said second belt, a friction member, a lever movably mounting said friction member on said stationary support adjacent the portion of said second belt passing over said driven pulley, a link connecting said lever with said pedestal to actuate said friction member by movement of said pedestal, and belt support means disposed adjacent portions of said second belt between said driving and driven pulleys for supporting said second belt when said second belt is loose.

3. A belt drive comprising, a stationary support, a drive motor, means pivotally mounting said drive motor on said stationary support, a jack shaft pedestal secured to said motor and projecting upwardly therefrom, a jack shaft secured in said pedestal, a motor pulley secured to the shaft of said motor, a flywheel, a driving pulley connected to said flywheel, said flywheel and driving pulley being mounted on said jack shaft, a driven pulley mounted on said stationary support, a first belt connecting said motor pulley and said flywheel, a second belt connecting said driving and driven pulleys, said motor and pedestal tilting toward said driven pulley to loosen said second belt, a brake band pivotally secured at one end about said driven pulley in spaced relation to that portion of said second belt passing thereover, a lever supporting the other end of said brake band, means pivotally mounting said lever on said stationary support, and a link connecting said lever to said pedestal to be actuated in a direction to apply said brake band to said second belt when said pedestal is moved toward said driven pulley.

4. A belt drive comprising, a stationary support, a drive motor, means pivotally mounting said drive motor on said stationary support, a jack shaft pedestal secured to said motor and projecting upwardly therefrom, a jack shaft secured in said pedestal, a motor pulley secured to the shaft of said motor, a flywheel, a driving pulley connected to said flywheel, said flywheel and driving pulley being mounted on said jack shaft, a driven pulley mounted on said stationary support, a first belt connecting said motor pulley and said flywheel, a second belt connecting said driving and driven pulleys, said motor and pedestal tilting toward said driven pulley to loosen said second belt, a brake band pivotally secured at one end about said driven pulley in spaced relation to that portion of said second belt passing thereover, a lever supporting the other end of said brake band, means pivotally mounting said lever on said stationary support, a link connecting said lever to said pedestal to be actuated in a direction to apply said brake band to said second belt when said pedestal is moved toward said drive pulley, and belt support means disposed adjacent portions of said second belt between said driving and driven pulleys for supporting said second belt when said second belt is loose.

5. A belt drive comprising, a stationary support, a drive motor, means pivotally mounting said drive motor on said stationary support, a jack shaft pedestal secured to said motor and projecting upwardly therefrom, a jack shaft secured in said pedestal, a motor pulley secured to the shaft of said motor, a flywheel, a driving pulley connected to said flywheel, said flywheel and driving pulley being mounted on said jack shaft, a driven pulley mounted on said stationary support, a first belt connecting said motor pulley and said flywheel, a second belt connecting said driving and driven pulleys, said motor and pedestal tilting toward said driven pulley to loosen said second belt, a brake band pivotally secured at one end about said driven pulley in spaced relation to that portion of said second belt passing thereover, a lever supporting the other end of said brake band, means pivotally mounting said lever on said stationary support, a link connecting said lever to said pedestal to be actuated in a direction to apply said brake band to said second belt when said pedestal is moved toward said driven pulley and belt guides paralleling and spaced from portions of said second belt when said second belt is taut for engaging and supporting said second belt when it is loose.

6. A belt drive comprising, a stationary support, pedestal means pivotally mounted on said support, and projecting upwardly therefrom, a pulley shaft secured in said pedestal means adjacent the upper end thereof, a driving pulley rotatably mounted on said pulley shaft, a motor stationarily disposed with respect to said driving pulley, a driven pulley rotatably mounted on said support in a position displaced from said driving pulley, drive means connecting said motor to drive said driving pulley, a belt connecting said driving and driven pulleys, said pedestal means tilting toward said driven pulley to loosen said belt, a friction member, a lever movably mounting said friction member on said stationary support adjacent the portion of said belt passing over said driven pulley, and a link connecting said lever with said pedestal means to actuate said friction member by movement of said pedestal means.

7. A belt drive comprising, a stationary support, pedestal means pivotally mounted on said support, and projecting upwardly therefrom, a pulley shaft secured in said pedestal means adjacent the upper end thereof, a driving pulley rotatably mounted on said pulley shaft, a motor stationarily disposed with respect to said driving pulley, a driven pulley rotatably mounted on said support in a position displaced from said driving pulley, drive means connecting said motor to drive said driving pulley, a belt connecting said driving and driven pulleys, said pedestal means tilting toward said driven pulley to loosen said belt, a brake band pivotally secured at one end about said driven pulley in spaced relation to that portion of said belt passing thereover, a lever supporting the other end of said brake band, means pivotally mounting said lever on said stationary support, a link connecting said lever to said pedestal means to be actuated in a direction to apply said brake band to said belt when said pedestal means is moved toward said driven pulley, and belt guides substantially paralleling and spaced from portions of said belt when said belt is taut for engaging and supporting said belt when said belt is loose.

8. A belt drive comprising, a stationary support, pedestal means pivotally mounted on said support, and projecting upwardly therefrom, a pulley shaft secured in said pedestal means adjacent the upper end thereof, a driving pulley rotatably mounted on said pulley shaft, a motor stationarily disposed with respect to said driving pulley, a driven pulley rotatably mounted on said support in a position displaced from said driving pulley, drive means connecting said motor to drive said driving pulley, a belt connecting said driving and driven pulleys, said pedestal means tilting toward said driven pulley to loosen said belt, a friction member, a lever movably mounting said friction member on said stationary support adjacent the portion of said belt passing over said driven pulley, a link connecting said lever with said pedestal means to actuate said friction member by movement of said pedestal means, and a toggle linkage connected at one end to said support and at the other end to said lever and locking said lever against movement with said friction member removed from said belt when said pedestal means is moved to a position tightening said belt.

9. A belt drive comprising, a stationary support, pedestal means pivotally mounted on said support, and projecting upwardly therefrom, a pulley shaft secured in said pedestal means adjacent the upper end thereof, a driving pulley rotatably mounted on said pulley shaft, a motor stationarily disposed with respect to said driving pulley, a driven pulley rotatably mounted on said support in a position displaced from said driving pulley, drive means connecting said motor to drive said driving pulley, a belt connecting said driving and driven pulleys, said pedestal means tilting toward said driven pulley to loosen said belt, a brake band pivotally secured at one end about said driven pulley in spaced relation to that portion of said belt passing thereover, a lever supporting the other end of said brake band, means pivotally mounting said lever on said stationary support, a link connecting said lever to said pedestal means to be actuated in a direction to apply said brake band to said belt when said pedestal means is moved toward said driven pulley, belt guides substantially paralleling and spaced from portions of said belt when said belt is taut for engaging and supporting said belt when said belt is loose, and a toggle linkage connected at one end to said support and at the other end to said lever and locking said lever against movement to remove said brake band from said belt when said pedestal means is moved to a position tightening said belt.

References Cited in the file of this patent
UNITED STATES PATENTS

| | | |
|---|---|---|
| Re. 21,472 | Christensen | June 4, 1940 |
| 1,136,246 | Levin | Apr. 20, 1915 |
| 2,459,373 | Gettys | Jan. 18, 1949 |
| 2,582,966 | Curtis | Jan. 22, 1952 |